United States Patent
Satish et al.

(10) Patent No.: US 12,547,931 B2
(45) Date of Patent: Feb. 10, 2026

(54) RETRAINING DOCUMENT-TAGGING MACHINE-LEARNED MODEL BASED ON ANONYMIZED DATA

(71) Applicant: DocuSign, Inc., San Francisco, CA (US)

(72) Inventors: Roshan Satish, Seattle, WA (US); Matthew John Thanabalan, Oakland, CA (US); David Wong, San Francisco, CA (US); Benjamin Edward Childs, Seattle, WA (US); Abhijit Salvi, Cupertino, CA (US); Vinay Jethava, Gothenburg (SE)

(73) Assignee: Docusign, Inc., San Francisco, CA (US)

( * ) Notice: Subject to any disclaimer, the term of this patent is extended or adjusted under 35 U.S.C. 154(b) by 1157 days.

(21) Appl. No.: 17/412,630

(22) Filed: Aug. 26, 2021

(65) Prior Publication Data
US 2023/0064367 A1 Mar. 2, 2023

(51) Int. Cl.
*G06N 20/00* (2019.01)
*G06F 16/93* (2019.01)

(52) U.S. Cl.
CPC ............. *G06N 20/00* (2019.01); *G06F 16/93* (2019.01)

(58) Field of Classification Search
CPC ................................ G06N 20/00; G06F 16/93
See application file for complete search history.

(56) References Cited

U.S. PATENT DOCUMENTS

2019/0065991 A1* 2/2019 Guggilla ................ G06N 20/00
2020/0321116 A1* 10/2020 Neumann ............. G16H 50/00
2021/0142222 A1* 5/2021 Chang ..................... G06F 17/18

OTHER PUBLICATIONS

"Ahmadreza Mosallanezhad ; Deep Reinforcement Learning-based Text Anonymization against Private-Attribute Inference ; 2019" (Year: 2019).*
"Chad Cumby ; A Machine Learning Based System for Semi-Automatically Redacting Documents ; 2011" (Year: 2011).*
Hassan, Fadi, et al. "Automatic anonymization of textual documents: detecting sensitive information via word embeddings." 2019 18th IEEE International Conference On Trust, Security And Privacy In Computing And Communications/13th IEEE International Conference On Big Data Science And Engineering (Year: 2019).*

* cited by examiner

*Primary Examiner* — Kevin W Figueroa
(74) *Attorney, Agent, or Firm* — Shumaker & Sieffert, P.A.

(57) ABSTRACT

A document management system trains a machine-learned model using a first training set of tagged documents to, when applied to a document, tag one or more portions of the document. The document management system applies the machine-learned model to a target document. One or more portions of the target document incorrectly tagged by the machine-learned model are identified. A feature vector representative of the target document is generated. Each entry of the feature vector is representative of a characteristic of the target document without including private information from the target document. The document management system queries a corpus of documents using the feature vector to identify a set of documents that correspond to the feature vector. A second training set of tagged documents is generated using the identified set of documents. The document management system retrains the machine-learned model using the second training set of tagged documents.

20 Claims, 5 Drawing Sheets

```
┌─────────────────────────────────────────────┐
│ Apply a machine-learned model configured to │
│ tag one or more document portions to a      │
│ target document 510                         │
└─────────────────────────────────────────────┘
                      ↓
┌─────────────────────────────────────────────┐
│ In response to one or more document portions│
│ of the target document being incorrectly    │
│ tagged, generate feature vector of target   │
│ document 520                                │
└─────────────────────────────────────────────┘
                      ↓
┌─────────────────────────────────────────────┐
│ Identify a set of documents within a        │
│ threshold similarity to the target document │
│ 530                                         │
└─────────────────────────────────────────────┘
                      ↓
┌─────────────────────────────────────────────┐
│ Retrain the machine-learned model using the │
│ identified set of documents 540             │
└─────────────────────────────────────────────┘
```

FIG. 5

RETRAINING DOCUMENT-TAGGING MACHINE-LEARNED MODEL BASED ON ANONYMIZED DATA

TECHNICAL FIELD

The disclosure generally relates to the training of a machine-learned model, and specifically to model retraining based on anonymized data.

BACKGROUND

Current systems, such as online document management systems, allow users to provide and create a document for tagging by the systems. Conventional systems may implement tagging models to identify components of the document to tag. However, tagging models often tag documents inaccurately and are not adapted to cope with user feedback. Further, model generation often involves the use of users' private information because tagging models are frequently trained with documents provided by system users, which may contain personal or otherwise sensitive information. While systems may secure private information, private information is often used by current systems without the user's permission and is still vulnerable to data leaks.

SUMMARY

The methods described herein are directed to retraining machine-learned models used to tag portions of documents with anonymized data in a document management environment. In some embodiments, a document management system of a document management environment trains a machine-learned model with a first training set of tagged documents. In these embodiments, the machine-learned model, when applied to a document, is configured to tag one or more portions of the document. The document management system applies the machine-learned model to a target document. The document management system identifies one or more portions of the target document that are incorrectly tagged by the machine-learned model. In some embodiments, the document management system may automatically detect incorrectly tagged portions. Alternatively, or additionally, the document management system may receive an indication from a user that one or more portions of the target document were incorrectly tagged.

In some embodiments, to effectively retrain the model using the target document but without including private information from the target document, a "skeleton" or feature vector representation of the target document is generated. The feature vector may include certain characteristics of the customer document, such as entries that identify the presence and/or absence of a feature, a feature type (e.g., a type of grammar used, a clause used, a document type, etc.), a presence and/or absence of text, a location of features within the target document, and/or any other characteristics of the target document (e.g., font size, font type, creation date, other metadata).

The document management system queries a corpus of documents using the feature vector to identify a set of documents corresponding to the feature vector. In some embodiments, the set of documents are identified based on a comparison between a plurality of feature vectors that correspond to additional documents, such as publicly available documents, with the feature vector of the target document. A second training set of tagged documents is generated using the identified set of documents. The identified set of documents may be manually tagged, tagged by a machine-learned model before, during and/or after retraining, or a combination thereof, to generate the second training set of tagged documents.

The document management system retrains the machine-learned model using the second training set of tagged documents. By generating the second training set of tagged document based on the original target document that was incorrectly tagged, the machine-learned model is retrained more effectively. In addition, by retraining the model without using private information associated with the target document and/or entities that provided or received the document, the privacy of the target document and the corresponding entities is preserved.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 2 illustrates an example interface in which a tagged document may be presented to a user, in accordance with one or more embodiments.

FIG. 5 illustrates an additional example process for retraining a machine-learned model based on anonymized data, in accordance with one or more embodiments.

DETAILED DESCRIPTION

Figure 1:
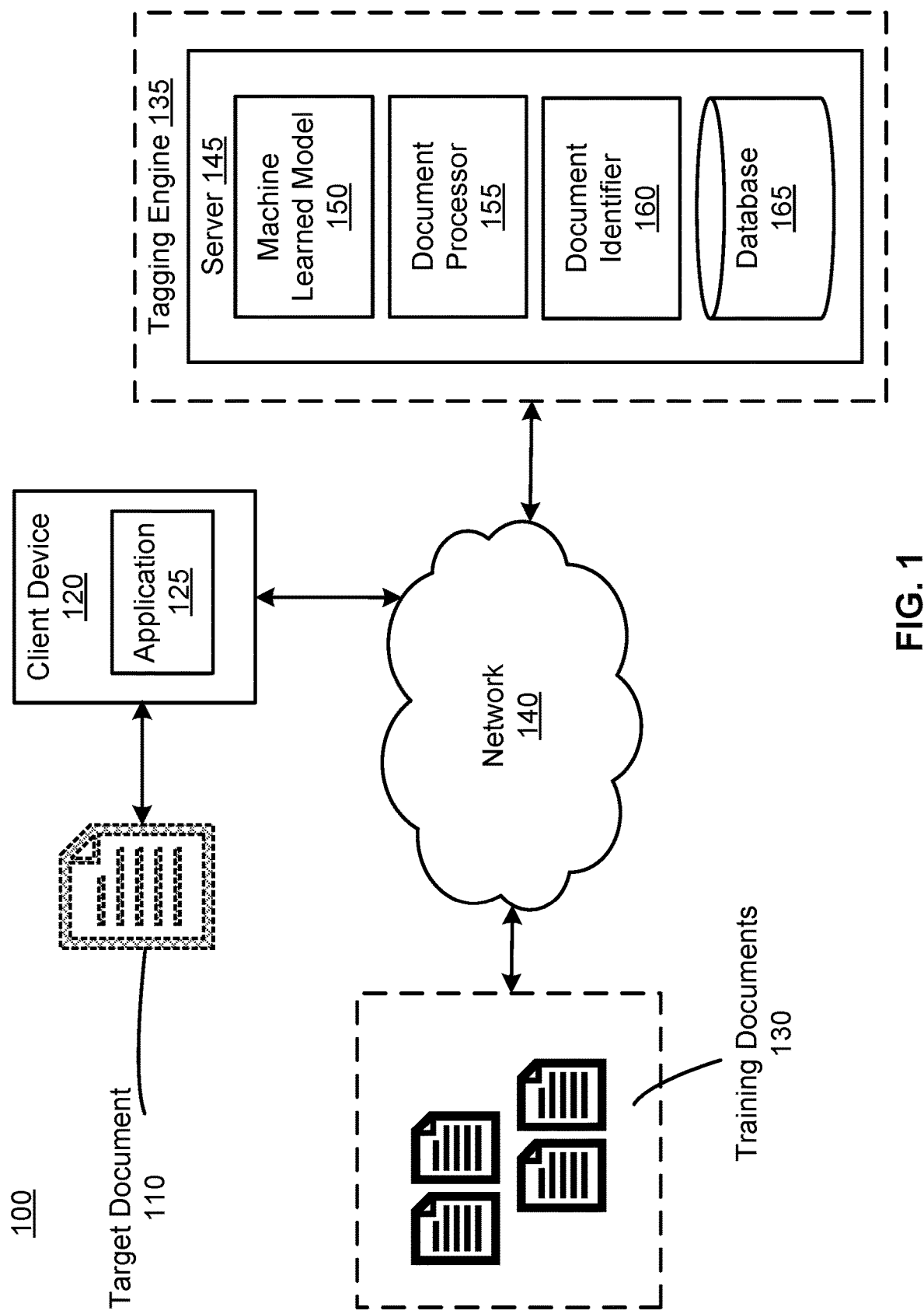
FIG. 1 illustrates an example document management environment, in accordance with one or more embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Document Management Environment Overview

The methods described herein are directed to retraining machine-learned models that are configured to tag portions of documents using anonymized data in a document management environment. The document management environment enables a party (e.g., individuals, organizations, etc.) to create and send documents to one or more receiving parties for negotiation, collaborative editing, electronic execution (e.g., electronic signature), automation of contract fulfilment, archival, and analysis. Within the document management environment, parties may review, agree to, and/or reject content and/or terms presented in a digital document. In addition, parties may electronically execute the document.

In some embodiments, parties may complete and/or contribute to a portion of the content and/or terms in the document through the use of tags. In some embodiments, tags are places within an electronic document in which a recipient provides input (such as signature, name, address, company, etc.), where a calculated value is displayed, or the like. Tags may be associated with a field of the document and a field type, which indicates a type of information to be filled in by a recipient (e.g., date, initials, signature, etc.). In addition, tags may be assigned to particular recipients. Tags may be associated with a set of characteristics, such as a type, a set of input parameters specifying a required input, a location, or the like. In some embodiments, users may place tags onto a document through an interface provided by a document management system of the document management environment.

Alternatively, or additionally, a document management system of the document management environment may place one or more document tags at various portions of a document. Tag placement may be determined using one or more machine-learned models that are trained and/or retrained using anonymized data and configured to tag one or more portions of a document.

In one embodiment, a document management system trains a machine-learned model with a first training set of tagged documents. The machine-learned model, when applied to a document, is configured to tag one or more portions of the document. The document management system applies the machine-learned model to a target document. The document management system identifies one or more portions of the target document that are incorrectly tagged by the machine-learned model. In some embodiments, the document management system may automatically detect incorrectly tagged portions. Alternatively, or additionally, the document management system may receive an indication from a user that one or more portions of the target document were incorrectly tagged.

To effectively retrain the model using the target document but without including private information from the target document, a "skeleton" or feature vector representation of the target document is generated. The feature vector includes entries each representative of certain characteristics of the customer document, such as entries that identify the presence and/or absence of a feature, a feature type (e.g., a type of grammar used, a clause used, a document type, etc.), a presence and/or absence of text, a location of features within the target document, and/or any other characteristics of the target document (e.g., font size, font type, creation date, other metadata).

The document management system queries a corpus of documents using the feature vector to identify a set of documents corresponding to the feature vector. In some embodiments, the set of documents are identified based on a comparison between a plurality of feature vectors that correspond to additional documents, such as publicly available documents, with the feature vector of the target document. For example, a set of publicly available documents that have feature vectors that are most similar (e.g., above a threshold similarity) to the feature vector of the target document may be identified. The feature vectors corresponding to the additional documents may be stored by the document management system, generated by the document management system before, during, and/or after retraining, obtained by one or more entities communicatively coupled to the document management system, or the like.

A second training set of tagged documents is generated using the identified set of documents. The identified set of documents may be manually tagged or tagged by a machine-learned model before, during and/or after retraining, or a combination thereof, to generate the second training set of tagged documents. In addition, the documents in the second training set of tagged documents may be labeled. The documents may be labeled manually, with one or more algorithms, with one or more machine-learned models, etc. Labels may indicate a document type, a set of fields associated with the document, locations of the fields in the set of fields, a set of tags associated with the document, location of the tags within the document, metadata (e.g., time of creation, log of edits, etc.), or the like. In some embodiments, the second training set of tagged documents includes the first training set of tagged documents.

The document management system retrains the machine-learned model using the second training set of tagged documents. By generating the training set based on the original target document that was incorrectly tagged, the machine-learned model is retrained more effectively. In addition, by retraining the model without using private information associated with the target document and/or entities that provided or received the document, the privacy of the target document and the corresponding entities is preserved.

The system environment described herein can be implemented within an online document system, a document management system, or any type of digital management platform. It should be noted that although description may be limited in certain contexts to a particular environment, this is for the purposes of simplicity only, and in practice the principles described herein can apply more broadly to the context of any digital management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital management platform.

FIG. 1 illustrates an example document management environment 100 in which machine-learned models configured to tag portions of a document are retrained using anonymized data. The document management environment 100 enables a sending party to create and send digital documents for electronic completion and/or execution to one or more receiving parties. The receiving parties may review, modify, and/or execute the documents. The document management environment 100 uses one or more machine-learned models to identify and tag portions of a document that correspond to fields of the document. In addition, the document management environment 100 retrains one or more machined-learned models to more effectively tag documents in response to one or more documents being incorrectly tagged.

As illustrated in FIG. 1, the document management environment 100 includes a target document 110 for tagging, a client device 120 with an application 125, a set of training documents 130, and a tagging engine 135, each communicatively interconnected via a network 140. In some embodiments, the document management environment 100 includes components other than those described herein. For the purposes of concision, the web servers, data centers, and other components associated with an online document management environment are not shown in the embodiment of FIG. 1.

The target document 110 for tagging is analyzed to identify portions of the target document (e.g., locations within the target document) that correspond to fields. A target document 110 is any document with one or more pages that includes various characters (e.g., text, symbols, shapes, images, etc.). Examples of target documents 110 include, but are not limited to, sales contracts, permission slips, rental agreements, liability waivers, financial documents, investment term sheets, purchase orders, employment agreements, mortgage applications, etc. The tagging engine 135 receives the target document 110 for tagging from a sending party via the client device 120 (or receives instructions to create the target document 110 within the document management environment 100 from the client device 120) and provides it to a receiving party (not illustrated in the embodiment of FIG. 1), for instance, for completion and/or signing. The target document 110 may contain information about parties associated with the document, including the sending party and the receiving party. Information may include private information, such as the terms of the document, the names and/or contact information of relevant parties, or the like. It should be noted that although examples are given herein in the context of a single document, the document management environment 100 can coordinate the creation, viewing, editing, and signing of any number of documents (e.g., thousands, millions, and more) for any number of users or accounts, and for any number of entities or organizations.

The client device 120 enables the user to create and/or provide the target document 110 for tagging to the tagging engine 135. The client device 120 is a computing device capable of transmitting and/or receiving data over the network 140. The client device 120 may be a conventional computer (e.g., a laptop or a desktop computer), a cell phone, or a similar device. After the tagging engine 135 tags the target document 110, the client device 120 may generate and display to the user a tagged target document 110 including one or more tags and/or corresponding field types for each tag. In some embodiments, the user may provide feedback to the tagging engine 135 via the client device 120. For example, the user may approve or reject the tags and corresponding field types identified and placed by the tagging engine 135. The tagging engine 135 may store data associated with user feedback in one or more databases of the tagging engine 135, such as which tags were rejected, whether a user modified one or more tags, user data associated with a user who modified, rejected, and/or accepted one or more tags, or the like.

Client device 120, as depicted, has application 125 installed thereon. Any or all client devices in the document management environment 100 may have application 125 installed thereon. Application 125 may be a stand-alone application downloaded by a client device. Alternatively, the application 125 may be accessed by way of a browser installed on the client device, accessing an application instantiated from the document management environment 100 using the browser. In the case of a stand-alone application, browser functionality may be used by the application 125 to access certain features of the document management environment 100 that are not downloaded to the client device 120. Application 125 may be used by a client device to perform any activity relating to a document, such as to create, design, assign permissions, circulate, access, sign, modify, add pictorial content, add accessibility information, or the like.

The training documents 130 serve as a training set of information for training and/or retraining the machine-learned model 150 to identify and tag fields within a document and portions of the document that correspond to each field. Training documents may be publicly available documents that have been queried from one or more locations in communication with the network 140. Alternatively, or additionally, training documents 130 may be documents provided by one or more users of the document management environment 100. For example, the training set of information can include historical documents associated with the document management environment 100. In some embodiments, users may be required to provide permission in order for their documents to be used as training documents 130.

Training documents 130 may be labeled and/or include a set of tagged fields within the document. Each tagged field corresponds to a portion of the document (i.e., a location within the document) where the user fills in information corresponding to the field, where a value is displayed to a user, or the like. In some embodiments, the tagged fields in a training document may be filled in with information, may not be filled in (i.e., left blank), or some combination thereof. Training documents may be manually tagged by users of the document management environment 100, tagged by a machine-learned model, such as machine-learned model 150, or a combination thereof. Labels may indicate a document type, a set of fields associated with the document, locations of the fields in the set of fields, a set of tags associated with the document, location of the tags within the document, metadata (e.g., time of creation, log of edits, etc.), or the like. The documents may be labeled manually, with one or more algorithms, one or more machine-learned models, etc. Alternatively, or additionally, training documents may be untagged and/or unlabeled documents and/or a portion of the training documents may be untagged and/or unlabeled.

The tagging engine 135 includes a server 145, which hosts and/or executes the machine-learned model 150, the document processor 155, document identifier 160, and a database 165. While one machine-learned model 150 is shown in the document management environment 100, multiple machine-learned models may be used by the tagging engine 135 to tag target documents, tag training documents, identify training documents, process documents and/or user feedback, or the like.

The server 145 receives and stores information from the document management environment 100. The server 145 may be located on a local or remote physical computer and/or may be located within a cloud-based computing system. The server 145 accesses the target document 110 for tagging by receiving it from the client device 120, retrieving the document from storage associated with the document management environment 100, retrieving the document from storage independent of the document management environment 100, or the like. In some embodiments, the server 145 receives feedback from the user regarding a target document 110, for instance feedback approving or rejecting tagged fields within the target document 110. In some embodiments, the server 145 is a document server, storing any number of documents within the document management environment 100, including the target document 110.

The tagging engine 135 applies tags to a target document 110 using a machine-learned model 150. The machine-learned model 150 is configured to tag, for at least one field within the target document 110, a portion of the target document 110 that corresponds to the field. The machine-learned model 150 is trained on a training set of data. In some embodiments, the training set of data includes tagged training documents 130, each including a set of tagged fields and/or a label. In other embodiments, the training set of data includes untagged and/or unlabeled training documents 130 and/or a portion of the training set of data includes untagged and/or unlabeled training documents 130. In these embodiments, the machine-learned model 150 may be trained with unsupervised and/or semi-supervised learning. After being trained, the machine-learned model 150 is applied to the target document 110. The machine-learned model 150 outputs tag information for one or more portions of the target document 110. For example, the machine-learned model 150 may output location coordinates at which tags should be placed, a type of tag to be placed, etc. In some embodiments, the machine-learned model 150 may place tags onto the target document 110. In other embodiments, the tagging engine 135 places tags onto the target document 110 based on the tag information outputted from the machine-learned model 150. For example, one or more models, such as one or more different machine-learned models, heuristics, algorithms, or the like, of the tagging engine 135 may tag portions of the target document 110 based on output from the machine-learned model 150. In addition, the tagging engine 135 may train and/or store different machine-learned models for different entities, documents, document types, or the like. For example, the tagging engine 135 may train and/or store a machine-learned model for sales contracts between parties in a first industry and train and/or store a different machine-learned model for licensing agreements between parties in a second industry.

The tagging engine 135 presents to the user, via the client device 120, the tagged target document. In some embodiments, the tagging engine 135 identifies tags in more than one document. Accordingly, the tagging engine 135 may present more than one document to the user. The tagging engine 135 may receive feedback from the user regarding one or more tagged documents. Feedback may include indications of whether the correct tags were placed within a document, whether the tags were placed in a correct location, whether one or more tags need to be added, whether one or more tags need to be removed, whether one or more tags need to be modified, or the like. Responsive to receiving an indication that the tagging engine 135 incorrectly tagged one or more portions of the tagged document, the tagging engine 135 retrains the machine-learned model 150 using the document processor 155, document identifier 160, data stored in the database 165, and/or the training documents 130.

The document processor 155 generates feature vectors (also referred to herein as "skeletons") of the target document and one or more training documents 130. Feature vectors include a set of entries that are each representative of a characteristic of the corresponding document. Entries of the feature vector may be numerical representations of characteristics of a document. Alternatively, or additionally, entries may include a Boolean representation, a decimal representation, a count representation, a string representation, etc., to represent one or more characteristics.

In some embodiments, to identify document characteristics, the document processor 155 identifies text of the documents using one or more processing techniques, such as natural language processing (NLP), optical character recognition (OCR), image classification, or the like. One or more additional machine-learned models may be used by the document processor 155 to implement the one or more processing techniques. Processing techniques may be based on the type of document being processed, the format of the document, etc. Data can be extracted from the documents using these processing techniques for use in generating a feature vector representative of the document.

Data extractions may be based on the text of the document, formatting of the document, grammar of the document, metadata of the document, a combination thereof, or the like. Examples of data extractions include, but are not limited to, assignability, auto-renewal terms, contract terms, termination convenience terms, termination cause terms, limitation of liability terms, indemnity terms, payment terms, termination dates, start dates, renewal notice periods, contract term duration, termination notice period, contract type, contracting parties, governing law, payment terms, jurisdiction, or the like. Data extractions may further include a type of grammar used, a type of boilerplate language used, a format of the document, a type of document, a font of the document, a font size of the document, a creation time, an execution time, a size of the document, or the like. In addition, characteristics may be based on a value in the document (e.g., a value of an execution date, etc.), the text of the document (such as the language of a particular clause), the presence or absence of a feature (e.g., whether the document included an indemnity clause), a combination thereof, or the like. Characteristics may also be based on the relationships between words and/or values within a document, the frequencies of words and/or values within a document, or the like.

The document processor 155 generates feature vectors without private information. Private information may be any information that can be used to infer the identify of an entity associated with the document, either directly or indirectly. In some embodiments, all feature vectors are generated without private information, including feature vectors corresponding to training documents 130. In other embodiments, some, all, or a portion of feature vectors associated with training documents 130 may include private information. The inclusion of private information may be based on the source of the training documents 130, permissions associated with the training documents 130, licenses obtained for the training documents 130, or the like. Anonymity operators may be performed to identify and remove sensitive data, for instance by recognizing a format of sensitive data (e.g., a social security number's XXX-YY-ZZZZ format).

The length of a feature vector may vary. Lengths may be based on the type of document, the machine-learned model being trained, the contents of the document, or the like. In some embodiments, feature vectors are the same length and/or are representative of the same set of characteristics. In other embodiments, feature vector lengths may differ based on the document, document type, or the like. For example, in some embodiments, all feature vectors may include the same number of entries, irrespective of the document contents of the corresponding documents. In these embodiments, when a document does not include a feature, the feature vector may include a null value at a corresponding entry. Accordingly, the same feature vector will be generated based on the properties of each document in the set of training documents (e.g., the set of publicly available documents), either in advance or in response to a request or decision to retrain the machine learned model 150. In other embodiments, the length of the feature vector may be based on the number and/or type of identified characteristics of the document.

The document identifier 160 identifies one or more training documents 130 to be included in a second training set of documents for retraining the machine-learned model 150. The document identifier 160 may compare a feature vector associated with the target document 110 to one or more feature vectors associated with the training documents 130. The document identifier 160 may identify the most similar entries by flagging training documents 130 that have the most entries in common with the target document 110 (e.g., a threshold number of training documents 130, all documents with a threshold similarity, etc.). Alternatively, or additionally, the document identifier may compare feature vectors using one or more vector comparison techniques, such as the dot product, cross product, etc. To compare the feature vectors, the document identifier 160 may determine a similarity score for the training documents. The similarity score may be based on a number of similar features, a number of dissimilar features, a degree of similarity, or the like, between the feature vector of the target document 110 and the feature vectors of the training documents 130. In other embodiments, to compare feature vectors, the document identifier 160 may determine any other suitable similarity metric for the training documents. Based on the comparison, the document identifier 160 identifies a set of training documents to be included in the second training set of documents. For example, the document identifier 160 may identify training documents 130 with feature vectors that have at least a threshold similarity to the target document 110, a threshold number of most similar training documents 130, training documents 130 with similarities falling within in a predetermined percentile (e.g., the top five percent most similar documents), or the like.

In some embodiments, the document identifier 160 may compare feature vectors using one or more machine-learned models. The one or more machine-learned models may be trained to identify a set of training documents 130 with similar feature vectors to that of a target document. To train a model, model input may include the feature vector of a target document and training feature vectors. Training feature vectors may be feature vectors generated by the document processor 155 from one or more training documents 130. Training feature vectors may be labeled and/or unlabeled. Labels may indicate a type of document associated with the feature vector, a set of tags included in the training document, fields included in the document, field types included in the document, a number of characteristics of the document, metadata of the document, or the like. In these embodiments, the machine-learned model may be trained using supervised learning. In other embodiments, the machine-learned model may be trained using unsupervised and/or semi-supervised learning. In addition, the document identifier 160 may train and/or store different machine-learned models for different documents, document types, entities, etc.

In some embodiments, the tagging engine 135 may tag the second training set of documents. In other embodiments, the training documents 130 are pre-tagged manually, with a machine-learned model, with a heuristic, or the like. The tagging engine 135 may retrain the machine-learned model 150 with the second training set of tagged documents. The tagging engine 135 may also test and/or validate the machine-learned model 150. Documents used for testing and/or validation may include a subset of training documents 130 identified by the document identifier 160, a different set of documents stored in the database 165 for testing and/or validation, documents received from one or more entities over the network 140, or the like. In addition, in some embodiments, a portion of testing and/or validation may be performed manually.

The database 165 stores information relevant to the tagging engine 135. The stored data includes, but is not limited to, target documents, training documents, testing documents, validation documents, feature vectors associated with the target document 110, training documents, testing documents, and/or validation documents, training set information, identified portions of the target document 110 associated with fields, text of the target document 110, a plurality of field types, identified field types associated with fields of the target document 110, feedback provided by users, etc. The tagging engine 135 can add any such information to the database 165 and can retrain the machine-learned model 150 based on this information. In some embodiments, information stored in the database 165 may be updated at predetermined intervals, upon a push by a user of the document management environment 100, manually, or the like. In addition, information used by the tagging engine 135 may be stored in one or more databases outside of and communicatively coupled to the tagging engine 135 via the network 140. Further, while one database 165 is shown, the tagging engine 135 may include multiple databases.

The network 140 transmits data within the document management environment 100. The network 140 may be a local area and/or wide area network using wireless and/or wired communication systems, such as the Internet. In some embodiments, the network 140 transmits data over a single connection (e.g., a data component of a cellular signal, or Wi-Fi, among others), and/or over multiple connections. The network 140 may include encryption capabilities to ensure the security of customer data. For example, encryption technologies may include secure sockets layers (SSL), transport layer security (TLS), virtual private networks (VPNs), and Internet Protocol security (IPsec), among others.

Figure 2:
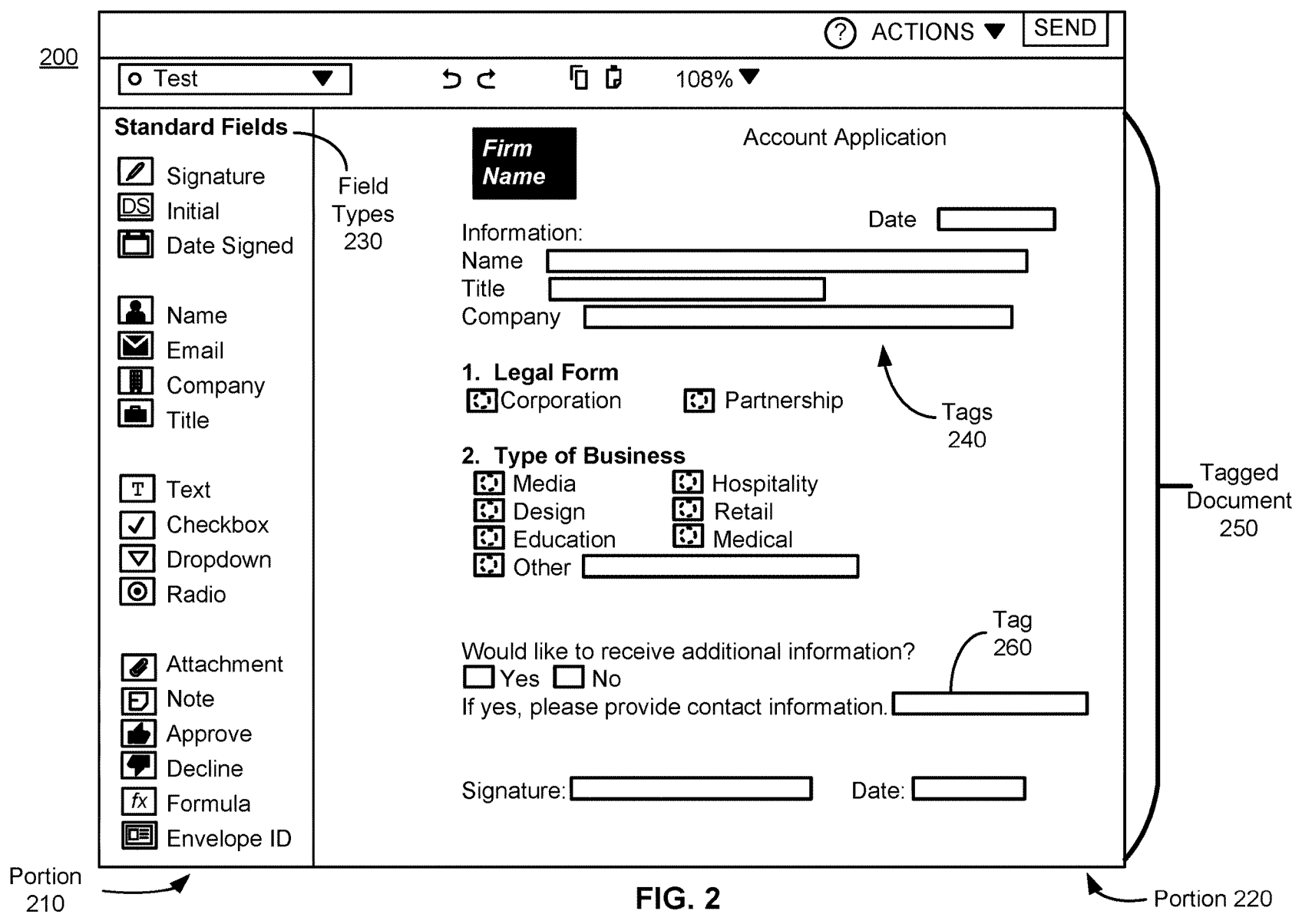

FIG. 2 illustrates an example interface in which a tagged document may be presented to a user, in accordance with one or more embodiments. After identifying a plurality of tags and associated field types within a target document for tagging, the tagging engine 135 presents the target document with the tags (i.e., a tagged document 250) to the user of the client device 120. Tagged documents include a set of tagged fields. A tagged field can include visual indicators, such as a box surrounding the field, a circle surrounding the field, a highlight applied to the field, a text box located adjacent to the field, a change of font size, color, or emphasis of the field, or some combination thereof. A tagged field may include a space to fill in text, a radio button to select or de-select, a checkbox to check or un-check, a dropdown box to select from a list of options, and so on. Each tagged field is located at a specific location within the document (i.e., at a portion of the document).

In an interface portion 210 of the interface 200, a listing of field types 230 are presented to the user. The listing of field types 230 includes both field types and field sub-types. For example, in the portion 210 of the interface 200, the listing of field types 230 includes a signature field, an initial field, a date signed field, a name field sub-type, an email field sub-type, a company field sub-type, a title filed sub-type, a text field, a checkbox field, a dropdown field, a radio button field, an attachment field, a note field, an approve button field, a decline button field, a formula field, and an envelope ID field. In some embodiments, the listing of field types 230 may include more than or less than the field types 230 illustrated in FIG. 2.

In an interface portion 220 of the interface 200, the tagged document 250 is displayed to the user. The tagged document includes various tags 240. In this example implementation, the tags 240 are illustrated as boxes around the fields (i.e., boxes encompassing portions of the document that need to be filled in by the user). In one embodiment, the field type 230 associated with each tag is displayed to the user without any user input. In this embodiment, the field type 230 may be displayed within the tag 240 or next to the tag 240 in the interface 200. In another embodiment, as a user selects (e.g., by clicking on, by hovering a cursor over, etc.) a tag 240, the field type 230 may be displayed to the user within the tag 240 or within a proximity of the tag 240 in the interface portion 220.

Examples of tags within the embodiment of FIG. 2 include a date tag, a name tag, a title tag, and a company tag (each being a "text box" field type); a "legal form" pair of tags (each being a "checkbox" field type); a set of "type of business" tags (being a combination of checkbox field types and text box field types); a "would you like to receive additional information" set of fields (being a combination of checkbox field types and text box field types); and a "signature" and "date signed" set of fields (being of the "signature" and "date signed" field types, respectively). It should be noted that each individual field within the embodiment of FIG. 2 does not include a separate reference number for the purposes of the simplicity only.

In some embodiments, the interface 200 of the client device 120 enables the user to provide feedback on the tags 240 of the document 250. A user may edit, add, and/or delete any or all of the tags 240 and/or field types 230. For example, a tag 260 may be associated with a text field and the user may decide to adjust the tag 260 to be an "email" field sub-type. The user may select the tag 260 (e.g., by clicking on the tag 260), and selecting an interface element corresponding to editing the field type 230 (not shown in FIG. 2). Accordingly, the tagging engine 135 receives user feedback through the interface 200 of the client device 120. Based on the user feedback, the tagging engine 135 may retrain the machine-learned model 150, described in detail below with reference to FIG. 3.

Figure 3:
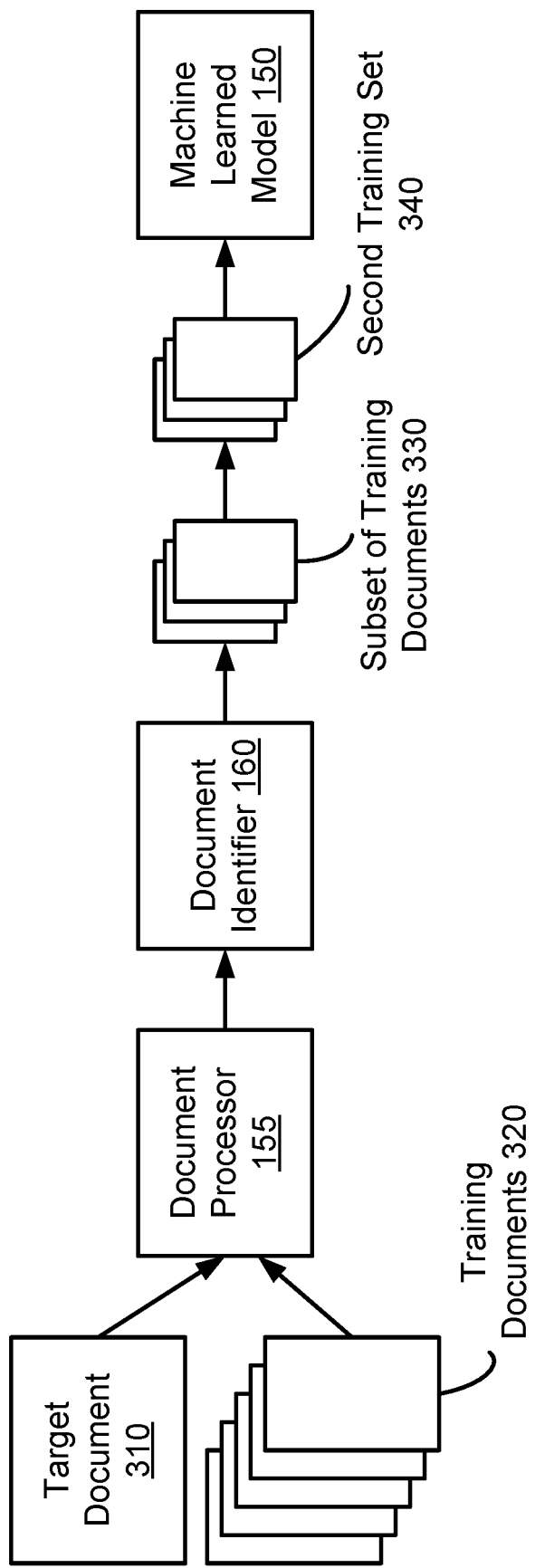
FIG. 3 illustrates data flow within an example tagging engine, in accordance with one or more embodiments.

FIG. 3 illustrates data flow within an example tagging engine 135, in accordance with one or more embodiments. The tagging engine 135 utilizes the document processor 155 and document identifier 160 to retrain the machine-learned model 150 configured to tag at least one portion of a target document 310 based on anonymized data. In one embodiment, the tagging engine 135 receives an indication that one or more portions of a target document 310 were incorrectly tagged, e.g., tagged incorrectly by the machine-learned model 150. A document portion may be incorrectly tagged where an incorrect tag has been placed, a tag is missing, too many tags were placed, a location of a tag is incorrect, or the like. The tagging engine 135 may receive the indication from a user via a client device 120 of the user, such as the user interface depicted in FIG. 2; from a component of the tagging engine 135, such as a machine-learned model 150 of the tagging engine 135; or any other component of the document management environment 100.

The tagging engine 135 accesses the target document 310 that was incorrectly tagged and a corpus of documents, such as the training documents 320. The tagging engine 135 may access a target document 310 from a user of the document management environment 100. Alternatively, or additionally, the tagging engine 135 may generate target documents, store target documents, receive target documents from a different document system, or the like. The tagging engine 135 may access training documents 320 from users of the document management environment 100, publicly available documents, documents from one or more document systems, or the like. The training documents 320 may include tagged documents, such as the tagged document shown in FIG. 2. Alternatively, or additionally, the training documents 320 may include untagged documents. In addition, the training documents 320 may not include identifying information of entities associated with the target document 310 and/or training documents 320.

The target document 310 and the training documents 320 are applied to the document processor 155. The target document 310 and the training documents 320 may be applied to the document processor 155 concurrently. Alternatively, or additionally, the target document 310 and the training documents 320 may be applied to the document processor 155 consecutively. The document processor 155 generates feature vectors for the target document 310 and at least a portion of the training documents 320.

The document identifier 160 identifies a subset of training documents 330 from the training documents 320 that correspond to the feature vector of the target document 110. As discussed with respect to FIG. 1, the document identifier 160 may identify the subset of training documents 330 based on a comparison of the feature vector corresponding to the target document 310 and the feature vectors associated with the training documents 320. A second training set of documents 340 is generated from the subset of training documents 320. The machine-learned model 150 is retrained using the second training set of documents 340. In some embodiments, portions of the documents in the second training set of documents 340 are tagged. In some embodiments, the documents are tagged manually, using one or more machine-learned models, or the like. The second training set of tagged documents 340 may be tagged prior to, during, and/or after retraining of the machine-learned model 150. In other embodiments, the second training set of documents 340 are not tagged.

Figure 4:
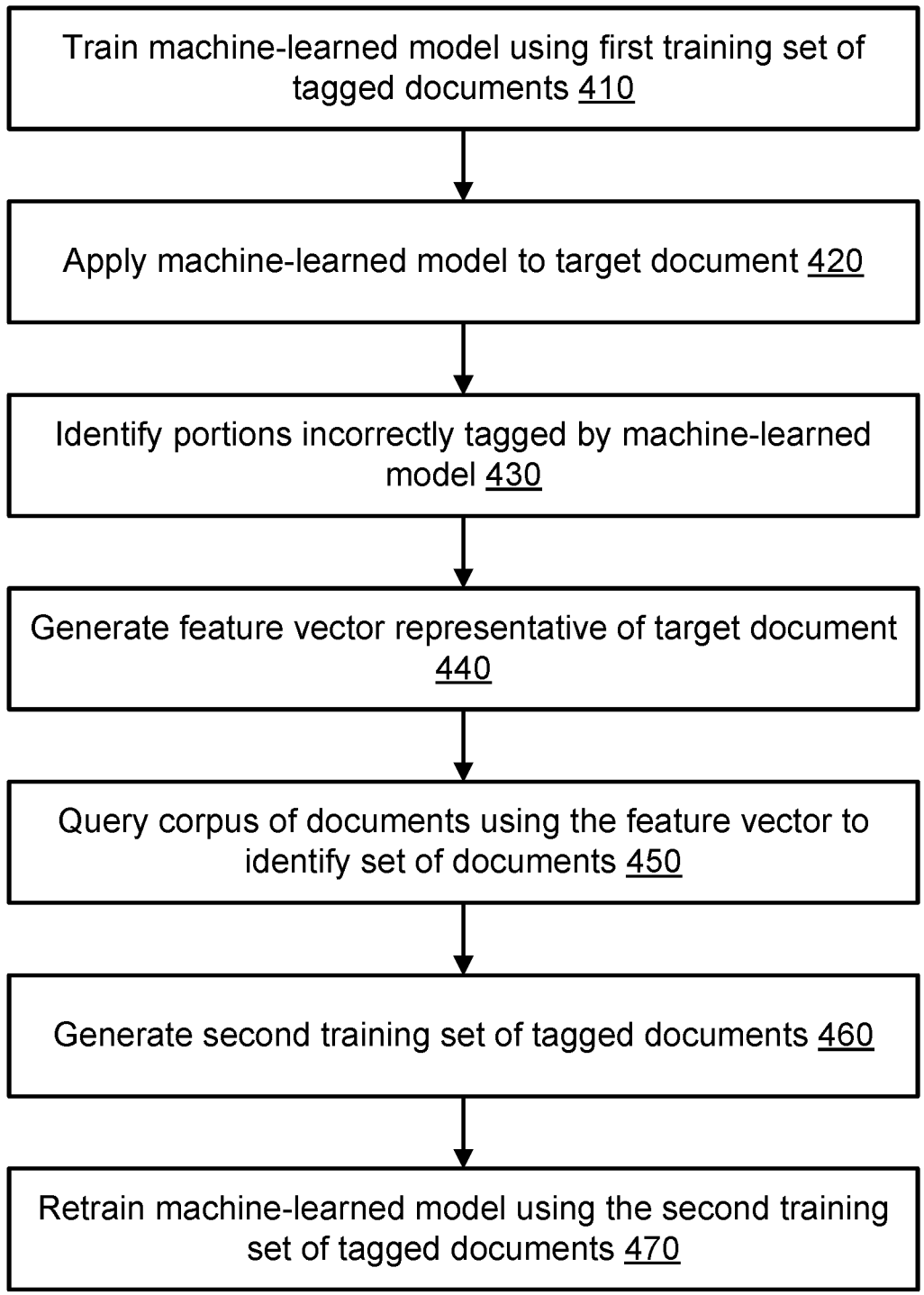
FIG. 4 illustrates an example process for retraining a machine-learned model based on anonymized data, in accordance with one or more embodiments.

FIG. 4 illustrates an example process 400 for retraining a machine-learned model based on anonymized data, in accordance with one or more embodiments. In the example process 400 shown, a document management system trains 410 a machine-learned model using a first training set of tagged documents to, when applied to a document, tag one or more portions of the document. As discussed with reference to FIG. 1, tagged portions of the document may correspond to fields of the document that are capable of receiving user input, such as a signature of the user. The document management system applies 420 the machine-learned model to a target document. One or more portions of the target document incorrectly tagged by the machine-learned model are identified 430. In some embodiments, the document management system identifies one or more portions of the target document that are incorrectly tagged based on user feedback, one or more additional machine-learned models, or the like.

A feature vector representative of the target document is generated 440. Each entry of the feature vector is representative of a characteristic of the target document without including private information from the target document. The feature vector may be generated such that identifying information of an entity associated with the target document is unidentifiable. In some embodiments, at least one entry of the feature vector includes at least one of a Boolean representation, a decimal representation, a count representation, or a string representation. In some embodiments, a characteristic of the target document may include a word type, a word count, a clause type, a clause count, a spacing, a heading, a document type, a renewal period, a renewal notice period, a termination date, a start date, a party type, a jurisdiction, a font, a font size, or the like.

The document management system queries 450 a corpus of documents using the feature vector to identify a set of documents that correspond to the feature vector. In some embodiments, to the document management system queries 450 the corpus of documents by generating additional feature vectors that are associated with documents in the corpus of documents. In these embodiments, the document management system compares the feature vector associated with the target document with the additional feature vectors. Additional feature vectors with a threshold similarity to the feature vector associated with the target document may be selected. The document system may then identify documents in the corpus of documents associated with the selected additional feature vectors.

A second training set of tagged documents is generated 460 using the identified set of documents. In some embodiments, the second training set of tagged documents is generated using one or more machine-learned models, manual generation, one or more heuristics, a combination thereof, or the like. The second training set of tagged documents may include the first training set of tagged documents.

The document management system retrains 470 the machine-learned model using the second training set of tagged documents. In some embodiments, the document management system retrains the machine-learned model by applying the machine-learned model to the second training set of tagged documents to generate predictions of tags for one or more portions of the tagged documents in the second set of tagged documents. In these embodiments, document management system updates weights of the machine-learned model based on the predictions and tags associated with each of the tagged documents in the second set of tagged documents.

FIG. 5 illustrates an additional example process 500 for retraining a machine-learned model based on anonymized data, in accordance with one or more embodiments. In the additional example process 500 shown, the document management system applies 510 a machine-learned model configured to tag one or more document portions to a target document. In response to one or more document portions of the target document being incorrectly tagged, the document management system generates 520 a feature vector representative of characteristics of the target document. A set of documents within a threshold similarity to the target document are identified 530 by querying a corpus of documents within the feature vector. The document management system retrains 540 the machine-learned model using the identified set of documents.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   training, by a document management system, a machine-learned model using a first training set of training documents, each training document in the first set of training documents labeled with first corresponding tags of a plurality of tags;
   assigning, by the document management system and based on the machine-learned model processing a target document, a first tag of the plurality of tags to one or more portions of the target document;
   identifying, by the document management system, whether a portion of the one or more portions of the target document is incorrectly assigned the first tag based on the machine-learned model processing the target document;
   based on identifying that the portion of the one or more portions of the target document is incorrectly assigned the first tag based on the machine-learned model processing the target document, generating, by the document management system, a feature vector for the target document, each entry of the feature vector indicative of a characteristic of the target document, wherein entries of the feature vector include anonymized data created based on the document management system removing sensitive data included in the target document;

querying, by the document management system and based on the anonymized data of the feature vector, a corpus of documents using the feature vector to identify a set of documents corresponding to the feature vector;

generating, by the document management system and based on the identified set of documents, a second training set of training documents, each training document in the second training set of training document labeled with second corresponding tags of the plurality of tags;

retraining, by the document management system, the machine-learned model using the second training set of training documents to be a retrained machine-learned model; and assigning, by the document management system and based on the retrained machine-learned model processing the target document, a second tag of the plurality of tags to the portion of the one or more portions of the target document.

2. The method of claim 1, wherein at least one entry of the feature vector includes at least one of: a Boolean representation, a decimal representation, a count representation, or a string representation.

3. The method of claim 1, wherein characteristics of the target document include at least one of: a word type, a word count, a clause type, a clause count, a spacing, a header, a document type, a renewal period, a renewal notice period, a termination date, a start date, a party type, a jurisdiction, a font, or a font size.

4. The method of claim 1, wherein querying the corpus of documents using the feature vector to identify the set of documents corresponding to the feature vector comprises:
generating, by the document management system, additional feature vectors, each additional feature vector associated with a document in the corpus of documents;
comparing the feature vector with the additional feature vectors; and
selecting additional feature vectors with a threshold similarity to the feature vector.

5. The method of claim 1, wherein the machine-learned model is a first machine-learned model, and wherein the second training set of training documents is generated using a second machine-learned model.

6. The method of claim 1, wherein the second training set of training documents includes the first training set of training documents.

7. The method of claim 1, wherein retraining the machine-learned model comprises:
applying the machine-learned model to the second training set of training documents to generate predictions of tags for one or more portions of documents in the second set of training documents;
updating weights of the machine-learned model based on the predictions and the second corresponding tags; and
generating, based on the updating the weights of the machine-learned model, the retrained machine-learned model.

8. The method of claim 1, wherein generating the feature vector comprises:
identifying the sensitive data included in the target document; and
removing, based on performing anonymity operators, the sensitive data included in the target document.

9. A system comprising:
processing circuitry; and
computer readable media comprising instructions that, when executed, cause the processing circuitry to:
train a machine-learned model using a first training set of training documents, each training document in the first set of training documents labeled with first corresponding tags of a plurality of tags;
assign, based on the machine-learned model processing a target document, a first tag of the plurality of tags to one or more portions of the document;
identify whether a portion of the one or more portions of the target document is incorrectly assigned the first tag based on the machine-learned model processing the target document;
based on identifying that the portion of the one or more portions of the target document is incorrectly assigned the first tag based on the machine-learned model processing the target document, generate a feature vector of the target document, each entry of the feature vector indicative of a characteristic of the target document, wherein entries of the feature vector include anonymized data created based on removing sensitive data included in the target document;
query, based on the anonymized data of the feature vector, a corpus of documents using the feature vector to identify a set of documents corresponding to the feature vector;
generate, based on the identified set of documents, a second training set of training documents, each training document in the second training set of training documents labeled with second corresponding tags of the plurality of tags;
retrain the machine-learned model using the second training set of training documents to be a retrained machine-learned model; and
assign, based on the retrained machine-learned model processing the target document, a second tag of the plurality of tags to the portion of the one or more portions of the target document.

10. The system of claim 9, wherein at least one entry of the feature vector includes at least one of: a Boolean representation, a decimal representation, a count representation, or a string representation.

11. The system of claim 9, wherein characteristics of the target document include at least one of: a word type, a word count, a clause type, a clause count, a spacing, a header, a document type, a renewal period, a renewal notice period, a termination date, a start date, a party type, a jurisdiction, a font, or a font size.

12. The system of claim 9, wherein to query the corpus of documents using the feature vector to identify the set of documents corresponding to the feature vector, the instructions cause the processing circuitry to:
generate additional feature vectors, each additional feature vector associated with a document in the corpus of documents;
compare the feature vector with the additional feature vectors; and select additional feature vectors with a threshold similarity to the feature vector.

13. The system of claim 9, wherein the machine-learned model is a first machine-learned model, and wherein the second training set of training documents is generated using a second machine-learned model.

14. The system of claim 9, wherein the second training set of training documents includes the first training set of training documents.

15. The system of claim 9, wherein to retrain the machine-learned model, the instructions cause the processing circuitry to:
    apply the machine-learned model to the second training set of training documents to generate predictions of tags for one or more portions of documents in the second set of training documents; and
    update weights of the machine-learned model based on the predictions and the second corresponding tags; and
    generate, based on updated weights of the machine-learned model, the retrained machine-learned model.

16. The system of claim 9, wherein to generate the feature vector, the instructions cause the processing circuitry to:
    identify the sensitive data included in the target document; and
    remove, based on performing anonymity operators, the sensitive data included in the target document.

17. Computer-readable media encoded with instructions that, when executed, cause processing circuitry to:
    train a machine-learned model using a first training set of training documents, each training document in the first training set of training documents labeled with first corresponding tags of a plurality of tags;
    assign, based on the machine-learned model processing a target document, a first tag of the plurality of tags to one or more portions of the document;
    identify whether a portion of the one or more portions of the target document is incorrectly assigned the first tag based on the machine-learned model processing the target document;
    based on identifying the portion of the one or more portions of the target document is incorrectly assigned the first tag based on the machine-learned model processing the target document, generate a feature vector for the target document, each entry of the feature vector indicative of a characteristic of the target document, wherein entries of the feature vector include anonymized data created based on removing sensitive data included in the target document;
    query, based on the anonymized data of the feature vector, a corpus of documents using the feature vector to identify a set of documents corresponding to the feature vector;
    generate, based on the identified set of documents, a second training set of training documents, each training document in the second training set of training documents labeled with second corresponding tags of the plurality of tags;
    retrain the machine-learned model using the second training set of training documents to be a retrained machine-learned model; and
    assign, based on the retrained machine-learned model processing the target document, a second tag of the plurality of tags to the portion of the one or more portions of the target document.

18. The computer-readable media of claim 17, wherein at least one entry of the feature vector includes at least one of: a Boolean representation, a decimal representation, a count representation, or a string representation.

19. The computer-readable media of claim 17, wherein characteristics of the target document include at least one of: a word type, a word count, a clause type, a clause count, a spacing, a header, a document type, a renewal period, a renewal notice period, a termination date, a start date, a party type, a jurisdiction, a font, or a font size.

20. The computer-readable media of claim 17, wherein to generate the feature vector, the instructions cause the processing circuitry to:
    identify the sensitive data included in the target document; and
    remove, based on performing anonymity operators, the sensitive data included in the target document.

* * * * *